(12) United States Patent
Wicker et al.

(10) Patent No.: US 11,167,581 B2
(45) Date of Patent: Nov. 9, 2021

(54) AUTHENTICATION HOLOGRAM

(71) Applicant: PROOF AUTHENTICATION CORPORATION, Rochester, NY (US)

(72) Inventors: David M. Wicker, Dansville, NY (US); Michael S. Caton, Oakfield, NY (US); William Valincourt, Rochester, NY (US)

(73) Assignee: PROOF AUTHENTICATION CORPORATION, Rochester, NY (US)

( * ) Notice: Subject to any disclaimer, the term of this patent is extended or adjusted under 35 U.S.C. 154(b) by 475 days.

(21) Appl. No.: 15/947,743

(22) Filed: Apr. 6, 2018

(65) Prior Publication Data

US 2019/0311240 A1    Oct. 10, 2019

(51) Int. Cl.
*B42D 25/328*    (2014.01)
*G06K 19/16*    (2006.01)
(Continued)

(52) U.S. Cl.
CPC .......... *B42D 25/328* (2014.10); *B42D 25/00* (2014.10); *B42D 25/43* (2014.10); *G03H 1/08* (2013.01); *G03H 1/2249* (2013.01); *G06F 21/31* (2013.01); *G06K 19/16* (2013.01); *G07D 7/005* (2017.05); *G07D 7/0032* (2017.05); *G07D 7/12* (2013.01); *G07D 7/20* (2013.01); *G07D 7/202* (2017.05); *B42D 25/373* (2014.10); *B42D 25/435* (2014.10); *G03H 2226/11* (2013.01); *G07D 7/0051* (2017.05)

(58) Field of Classification Search
None
See application file for complete search history.

(56) References Cited

U.S. PATENT DOCUMENTS 4,913,858 A    4/1990    Miekka et al.
5,464,690 A    11/1995    Boswell
(Continued)

FOREIGN PATENT DOCUMENTS

| JP | 2010149388 A | 7/2010 |
|---|---|---|
| JP | 2017032986 A | 2/2017 |
| WO | 2014059439 A1 | 4/2014 |

OTHER PUBLICATIONS

International Search Report and Written Opinion dated Aug. 16, 2019 for Application No. PCT/US2019/026322, pp. 1-17.

*Primary Examiner* — Derek S. Chapel
(74) *Attorney, Agent, or Firm* — Orrick, Herrington & Sutcliffe LLP

(57) ABSTRACT

An authentication system includes an object including an authentication hologram disposed over an area of a surface of the object. The authentication hologram is defined by a pattern of reflective material and includes latent authentication information. The system includes a computer-readable medium including program instructions for execution by one or more processors. The program instructions are executable by the one or more processors to: (i) receive, from an image capture device, a digital image of the authentication hologram, wherein light reflected by the reflective material is captured in the digital image of the authentication hologram, and (ii) detect the latent authentication information in the digital image of the authentication hologram, wherein an effect of the reflected light is reduced to detect the latent authentication information.

20 Claims, 5 Drawing Sheets

(51) Int. Cl.
  *G07D 7/202* (2016.01)
  *G07D 7/005* (2016.01)
  *B42D 25/43* (2014.01)
  *G03H 1/22* (2006.01)
  *G03H 1/08* (2006.01)
  *G06F 21/31* (2013.01)
  *B42D 25/00* (2014.01)
  *G07D 7/00* (2016.01)
  *G07D 7/12* (2016.01)
  *G07D 7/20* (2016.01)
  *B42D 25/435* (2014.01)
  *B42D 25/373* (2014.01)

(56) References Cited

U.S. PATENT DOCUMENTS

| | | | |
|---|---|---|---|
| 6,201,616 B1 * | 3/2001 | Sasanuma | G03G 21/046 358/450 |
| 6,614,914 B1 * | 9/2003 | Rhoads | B42D 25/00 382/100 |
| 8,437,578 B2 | 5/2013 | Alasia et al. | |
| 8,444,181 B2 | 5/2013 | Wicker et al. | |
| 9,171,347 B2 | 10/2015 | Caton et al. | |
| 9,195,870 B2 | 11/2015 | Rowe | |
| 9,661,770 B2 | 5/2017 | McCormack et al. | |
| 9,666,008 B2 | 5/2017 | Hill | |
| 9,718,296 B2 | 8/2017 | Rodriguez | |
| 2010/0043076 A1 | 2/2010 | Wesby | |
| 2010/0110514 A1 | 5/2010 | Houha et al. | |
| 2010/0135524 A1 | 6/2010 | Durst et al. | |
| 2011/0140842 A1 | 6/2011 | Greene | |
| 2012/0013960 A1 | 1/2012 | Millington et al. | |
| 2013/0169677 A1 | 7/2013 | Rosset et al. | |
| 2015/0302421 A1 | 10/2015 | Caton et al. | |
| 2016/0189326 A1 * | 6/2016 | Rodriguez | B42D 25/00 455/556.1 |
| 2016/0307035 A1 | 10/2016 | Schilling et al. | |
| 2016/0355693 A1 | 12/2016 | Grigorenko et al. | |
| 2017/0006180 A1 | 1/2017 | Hill | |
| 2017/0028765 A1 | 2/2017 | Staub et al. | |
| 2017/0066278 A1 | 3/2017 | Massicot et al. | |
| 2017/0066279 A1 | 3/2017 | Walker et al. | |
| 2017/0278333 A1 | 9/2017 | Mercolino et al. | |
| 2019/0384955 A1 * | 12/2019 | Frieser | G06K 7/1417 |

* cited by examiner

AUTHENTICATION HOLOGRAM

FIELD OF THE INVENTION

The present disclosure generally relates to the authentication of objects, such as secure documents, and more particularly to systems and methods that employ authenticatable holograms to distinguish original objects from copies.

BACKGROUND

Secure documents, such as valuable papers, important records, identification cards, or financial instruments (e.g., checks, currency, or credit/debit cards), are often subject to counterfeiting. Advancing technology, such as improved computer software, printers, scanners, and copiers, has enabled the proliferation of counterfeit documents.

SUMMARY

Authentication holograms with latent information are employed to authenticate objects, such as secure documents, and to prevent unauthorized reproduction of such objects. The latent information can be decoded and/or compared to known validation information to determine the authenticity of the objects. Such authentication holograms may be set among various visual elements to hide the authentication holograms from easy detection. Furthermore, various approaches for capturing images of the authentication holograms and extracting the latent information overcome the problem caused by light reflected by the authentication holograms, which can obscure the authentication holograms in the captured images.

According to an example embodiment, an authentication system includes an object including an authentication hologram disposed over an area of a surface of the object. The authentication hologram is defined by a pattern of reflective material and includes latent authentication information. The system includes a computer-readable medium including program instructions for execution by one or more processors. The program instructions are executable by the one or more processors to: (i) receive, from an image capture device, a digital image of the authentication hologram, wherein light reflected by the reflective material is captured in the digital image of the authentication hologram, and (ii) detect the latent authentication information in the digital image of the authentication hologram, wherein an effect of the reflected light is reduced to detect the latent authentication information.

According to another example embodiment, an authenticatable object includes an authentication hologram disposed over an area of a surface of the object. The authentication hologram includes latent authentication information. The authenticatable object includes a laminate applied over the area of the surface of the object. The authenticatable object includes one or more additional visual elements applied at least partially over the authentication hologram.

Figure 1A:
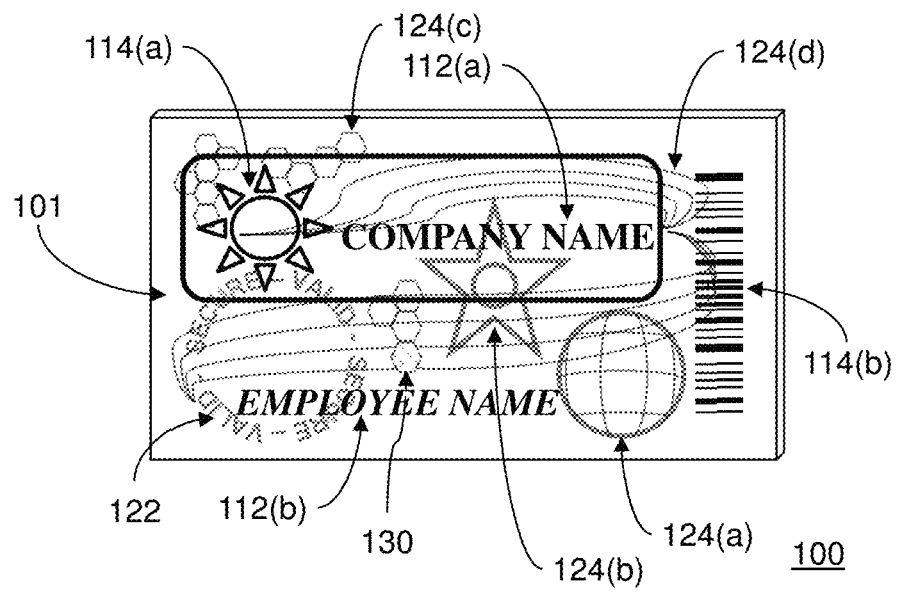
FIG. 1A illustrates an example object that can be authenticated and distinguished from copies of the object, according to aspects of the present disclosure.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit of the invention.

DESCRIPTION

FIG. 1A illustrates an example object 100 that can be authenticated and distinguished from copies (e.g., unauthorized copies) of the object 100. Although the object 100 shown in FIG. 1A may appear to be an employee identification card, the object 100 may be any type of object that may require authentication, such as a valuable document, an important record, or a financial instrument (e.g., check, currency, or credit/debit card).

Various types of printed elements appear on a surface 101 of the object 100. The printed elements include text 112 and non-text elements 114. As used herein, text may refer to any form of written language, including letters, characters, symbols, numbers, punctuation, or the like. As shown in FIG. 1A, for instance, text 112(a) indicates a company name and text 112(b) specifies an employee name. Meanwhile, non-text elements may refer to pictures, graphics, patterns, shapes, markings (e.g., line segments, dots, squiggles, etc.), or the like. As shown in FIG. 1A, for instance, the non-text elements 114 include a company logo 114(a) and a barcode 114(b). The barcode 114(b) may be scanned to identify an employee and/or provide access to secure locations. The barcode 114(b) itself may provide information that can indicate the authenticity of the object 100. Unlike the barcode 114(b), however, other non-text elements do not necessarily convey any type of information.

The printed elements 112, 114 may be applied to the surface 101 through the application of ink, paint, toner, or the like. Other approaches for applying the printed elements 112, 114 may also include thermal printing, engraving, embossing, or the like. The printed elements 112, 114 may also be applied in any number of colors.

According to some techniques, printed elements may be applied to an object in a manner that makes the printed elements difficult to reproduce. The presence of such printed elements can thus indicate whether the object is authentic. For instance, printed elements may include many complex and intricate features that are more difficult to copy. Additionally or alternatively, printed elements may include many small details that are more difficult to distinguish and reproduce. Additionally or alternatively, printed elements may include "hidden" features that are not easily visible to the human eye. Additionally or alternatively, printed elements may include special colors that are more difficult to reproduce. These printing techniques, however, may be less effective for authenticating an object, because current scanner, copier, printer, and computer-based reproduction technologies may be capable of reproducing printed elements accurately, regardless of the number of complex, intricate, small, "hidden," and/or specially colored details or features.

Thus, to make the object 100 more difficult to copy, the object 100 also includes a plurality of holograms on the surface 101. As FIG. 1A illustrates, the holograms include text 122 and non-text elements 124. As is known, holography generally involves recording a light field produced by laser light that is scattered by a subject. A hologram allows the light field to be reconstructed in order to display a three-dimensional image of the subject without any optical aids. Applying the holograms 122, 124 to the object 100 typically requires more equipment and technology than applying the printed elements 112, 114. The application of the holograms 122, 124 to the surface 101, for instance, may involve embossing, debossing, laser etching, laser engraving, laser imaging, three-dimensional printing, and/or hot or cold foil processing. As shown in FIG. 1A, the object 100 includes a complex arrangement of holograms 122, 124 to increase the difficulty of accurately copying the object 100. For instance, the holograms include many different graphics 124(a)-(c) as well as a pattern of curved lines 124(d).

Although the presence of the holograms 122, 124 can indicate whether the object 100 is authentic, the object 100 also includes a particular authentication hologram 130 that allows the object 100 to be authenticated with even greater certainty. As shown in FIG. 1A, the authentication hologram 130 has a hexagonal shape and is visually hidden, or camouflaged, among the other various holograms 122, 124, some of which also have hexagonal shapes. Additionally, aspects of the printed elements 112, 114 can also act to camouflage the authentication hologram 130. Collectively, the printed elements 112, 114 and the holograms 122, 124 constitute visual elements that make the authentication hologram 130 more difficult to detect.

Figure 1B:
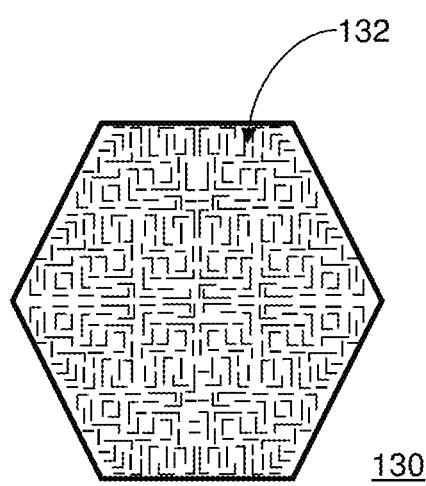
FIG. 1B illustrates an example authentication hologram including latent authentication information for authenticating an object, according to aspects of the present disclosure.

As shown in FIG. 1B, the authentication hologram 130 includes latent authentication information 132, which can be evaluated to determine whether the object 100 is authentic. As used herein, latent authentication information may refer to authentication information that is not distinguishable with the human eye alone and requires an additional device to detect or process the authentication information. The latent authentication information 132 illustrated in FIG. 1B is defined by a complex pattern of line segments. The small size of the authentication hologram 130 and the complexity of the pattern make the details of the latent authentication information 132 essentially impossible to distinguish with the human eye alone. Additionally or alternatively, the latent authentication information 132 may be defined by any arrangement of letters, characters, symbols, numbers, shapes, and/or other markings.

Figure 2:
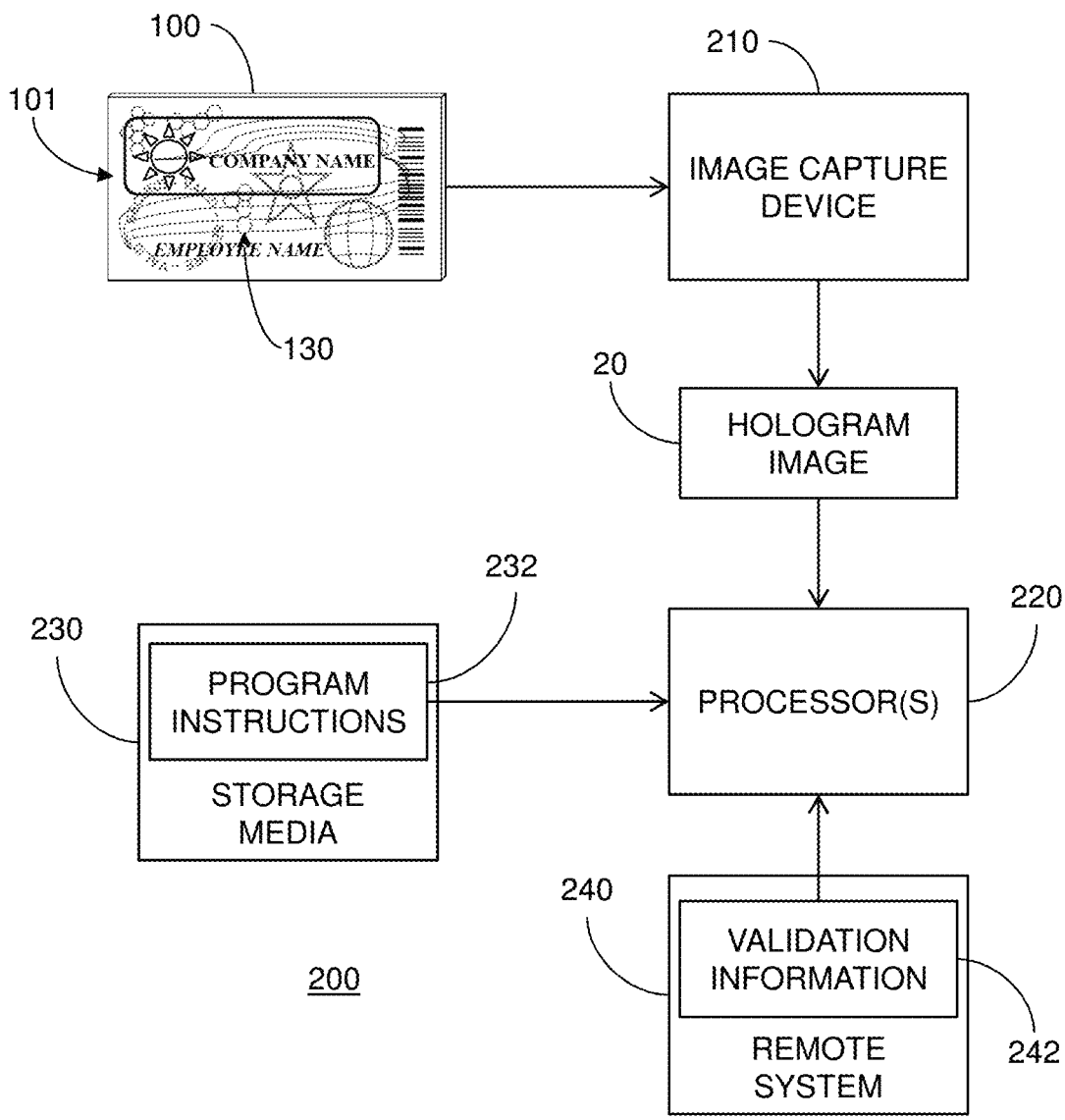
FIG. 2 illustrates an example authentication system for authenticating an object, according to aspects of the present disclosure.

FIG. 2 illustrates an example authentication system 200 for authenticating the object 100. The example authentication system 200 includes an image capture device 210 (e.g., a digital camera) and one or more processors 220 communicatively coupled to the image capture device 210. The processor(s) 220 can execute program instructions 232 stored on computer-readable storage media 230. In some implementations, a smart device, such as a smart telephone, may assemble the image capture device 210, the processor(s) 220, and the storage media 230 in an integrated device. As such, the program instructions 232 can be uploaded and stored as a mobile application on the storage media 230 of the smart device, so that the smart device can perform the various functions of the example authentication system 200.

Executing the program instructions 232, the processor(s) 220 can cause the image capture device 210 to capture a digital image 20 of the surface 101 of the object 100. The resulting digital image 20 includes an image of the authentication hologram 130 among the various visual elements. Upon receiving the digital image 20, the processor(s) 220 can detect the authentication hologram 130 and, more specifically, the latent authentication information 132 in the authentication hologram 130. For this image processing, the processor(s) 220 may employ image segmentation techniques to detect the authentication hologram 130 within the image 20 and to extract the latent authentication information 132 from the image 20.

In some embodiments, the processor(s) 220 can evaluate the latent authentication information 132 against known validation information 242. For instance, if the latent authentication information 132 is defined as the complex pattern of line segments shown in FIG. 1B, the processor(s) 220 can employ image matching techniques to determine whether the latent authentication information 132 matches the validation information 242. If the latent authentication information 132 matches the validation information 242, the object 100 can be considered authentic.

As shown in FIG. 2, the authentication system 200 may include a remote system 240 that can store the validation information 242 in a master repository. The remote system 240 can be communicatively coupled to the processor(s) 220 over a wired or wireless network, so the processor(s) 220 can access the validation information 242 to evaluate the latent authentication information 132. Alternatively, the processor(s) 220 can send the latent authentication information 132 to the remote system 240, which can remotely evaluate the latent authentication information 132 against the validation information 242 and communicate the results of the evaluation to the processor(s) 220.

Additionally or alternatively, the storage media 230 can store the validation information 242 locally, so that the processor(s) 220 do not have to access the remote system 240. For instance, if the authentication system 200 is implemented with a smart device, the smart device can store the validation information 242 with the uploaded mobile application.

Additionally or alternatively, the processor(s) 220 can decode and otherwise process the latent authentication information 132, without reference to known validation information. Thus, an alternative authentication system can employ just the image capture device 210, the processor(s) 220, and the storage media 230 with the program instructions 232, e.g., assembled in a smart device, without the remote system 240. This alternative authentication system can determine the authenticity of the object 100 from indications encoded directly within the latent authentication information 132 (without comparison to known validation information stored in a remote system). For instance, the processor(s) 220 may apply a proprietary decoding algorithm to the latent authentication information 132 to derive further information that indicates the authenticity of the object 100. The use of the proprietary decoding algorithm enhances the security of the authentication process. In some cases, the processor(s) 220 can decode different information from latent authentication information located in different respective parts of the authentication hologram 130.

As shown in FIG. 1A, the object 100 includes a single authentication hologram 130. In other embodiments, however, the object 100 may include more than one authentication hologram at different locations on the object 100. Security for the authentication process can be enhanced, for instance, by requiring multiple matches between known validation information and the latent authentication information from multiple authentication holograms.

In some embodiments, each of the authentication holograms may include the same latent authentication information. This redundancy can make the authentication system 200 more robust by allowing the authentication system 200 to evaluate other authentication holograms if there is an error processing one of the authentication holograms.

In other embodiments, multiple authentication holograms may include different respective latent authentication information. Requiring different latent authentication information for multiple authentication holograms makes copying the object 100 more difficult. The processor(s) 220 can evaluate different latent authentication information from multiple authentication holograms to authenticate the object 100. In some cases, the processor(s) 220 can evaluate the different latent authentication information against known validation information, e.g., stored by the remote system 240. In other cases, the processor(s) 220 can decode the different latent authentication information with a decoding algorithm to derive information that indicates the authenticity of the object 100.

Figure 3:
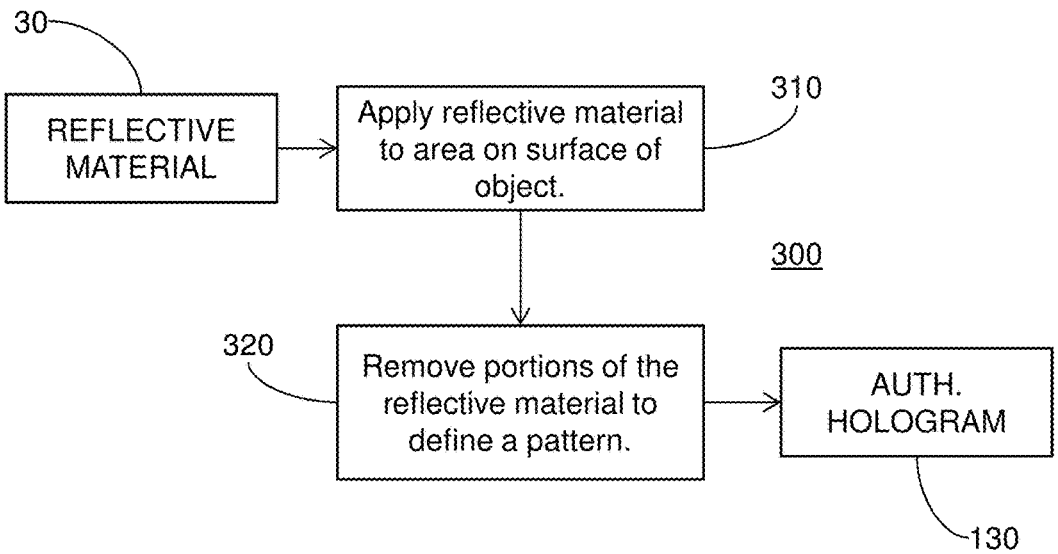
FIG. 3 illustrates an example process for creating an authentication hologram, according to aspects of the present disclosure.

FIG. 3 illustrates an example process 300 for creating the authentication hologram 130. In act 310, reflective material 30 is applied to a desired area of the surface 101 of the object 100. The reflective material 30 may include a metal, such as silver, copper, and/or gold. In some embodiments, a metalized plastic may be applied to the surface 101. The reflective material 30 may be applied as a foil to the surface 101. Additionally, the reflective material 30 may also be applied by hot or cold stamping.

In act 320, portions of the reflective material 300 are removed from the initial application of the reflective material 30 to leave a pattern of the reflective material 30 on the area. The reflective material 300, for instance, may be removed by laser ablation. The resulting pattern corresponds to the latent authentication information 132. In particular, the pattern for the latent authentication information 132 shown in FIG. 1B is defined by the complex pattern of line segments formed from the reflective material 30 remaining after act 320. The removal of the reflective material 30 in act 320 is sufficiently precise to produce complex patterns with small details as shown, for instance, in FIG. 1B.

The reflective material 30 employed to form the authentication hologram 130 reflects incident light. Generally, this reflection makes it more difficult to capture images of patterns formed by the reflective material 30. Specifically, reflected light can obscure the authentication hologram 130 in captured images and make it extremely difficult to distinguish the latent authentication information 132 in the authentication hologram 130. For this reason, holograms have not been previously employed to hold latent authentication information.

Aspects of the present disclosure include approaches for minimizing the effect of the reflected light and allowing latent authentication information in an authentication hologram to be successfully detected and evaluated. For instance, in act 320 described above, the removal of a sufficient amount of the reflective material 30 from the surface 101 can reduce the amount of light reflected by the authentication hologram 130. After act 320, at least approximately 20% to approximately 80% of the reflective material 30 may remain on the surface 101. In some cases, at least approximately 40% to approximately 50% of the reflective material 30 may remain on the surface 101. The reduction in reflected light based on the removal of the reflective material 30 can make images of the authentication hologram 130 less obscure and help the authentication system 200 detect and distinguish the details in the pattern of the latent authentication information 132.

Furthermore, the image processing by the processor(s) 220 in the authentication system 200 can be tuned to detect and distinguish the details of the latent authentication information 132 in the captured image 20 more effectively. For instance, executing the program instructions 232, the processor(s) 220 can determine a contrast level for the captured image 20 and then apply a filter based on the contrast level to enhance the clarity of the latent authentication information 132 in the captured image 20. In particular, the image processing can be tuned to overcome the limitations (e.g., limited resolution) of the image capture capabilities of current smart devices to detect the latent authentication information 132 successfully. Advantageously, current scanner and copier technologies are not capable of detecting and distinguishing the details of the latent authentication information 132; instead, the light reflected by the authentication hologram 130 typically causes the authentication hologram 130 to appear as a blackened shape to current scanners and copiers.

Figure 4:
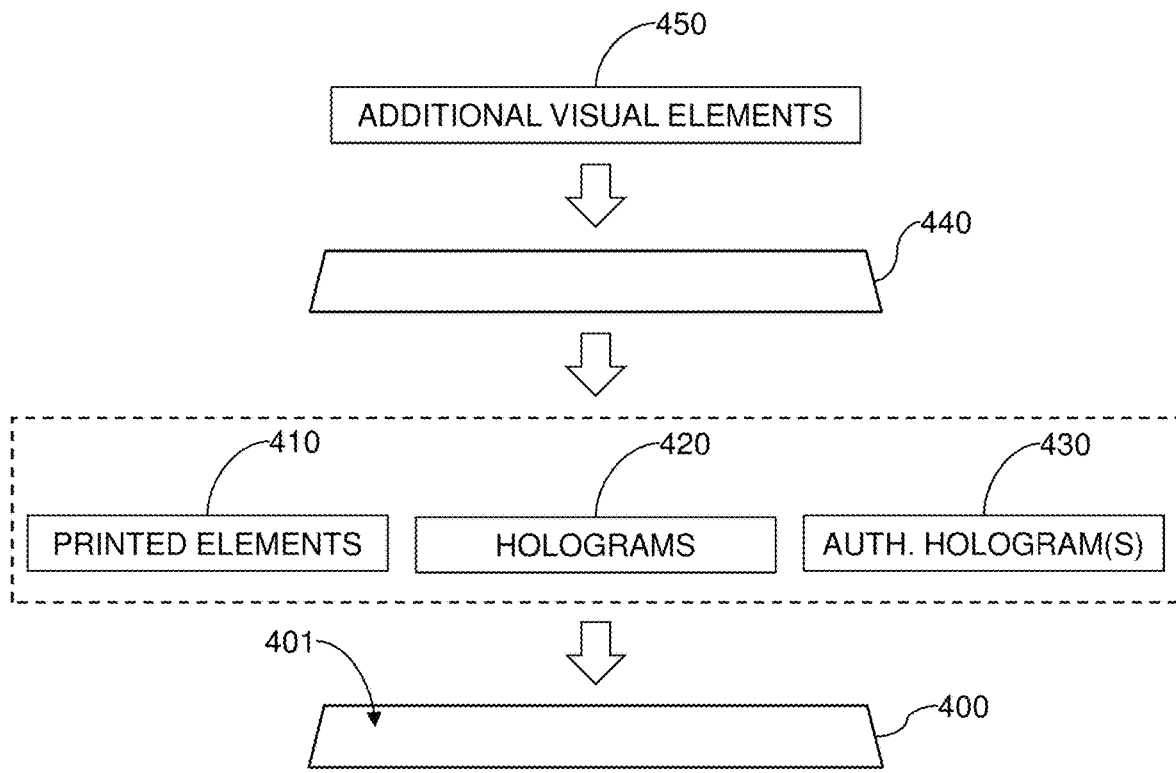
FIG. 4 illustrates an example authenticatable object with printed elements, holograms including authentication hologram(s), and a laminate applied to the object, according to aspects of the present disclosure.

As illustrated in FIG. 4, another example authenticatable object 400 includes printed elements 410 and holograms 420. The printed elements 410 may be similar to the printed elements 112, 114 described above, and the holograms 420 may be similar to the holograms 122, 124 described above. The holograms 420 may be applied to a surface 401 of the object 400, and the printed elements 410 may then be applied over the holograms 420. Alternatively, the printed elements 410 may be applied to the surface 101 before the holograms 420. The object 400 also includes one or more authentication holograms 430. The authentication hologram(s) 430 may be applied to the surface, for instance, according to the example process 300 described above. The authentication hologram(s) 430 include latent authentication information defined by any arrangement of letters, characters, symbols, numbers, shapes, and/or markings (line segments, dots, squiggles, etc.). In general, the printed elements 410 and holograms 420 constitute visual elements that can help to camouflage the authentication hologram(s) 430.

As FIG. 4 also illustrates, a laminate 440 may be applied over the printed elements 410, the holograms 420, and the authentication hologram(s) 430. The laminate 440, for instance, may be a polycarbonate laminate or a polyvinyl chloride laminate. Advantageously, the laminate 440 can diffuse light and further reduce the amount of reflected light from the authentication hologram(s) 430. Employing the authentication system 200 described above, the program instructions 232 executed by the processor(s) 220 can be further tuned to account for the effect of the laminate 440 when detecting and processing the latent authentication information in the authentication hologram(s) 430.

In some cases, the laminate 440 may be translucent to allow the area under the laminate 440 to be visible through the laminate 440. In other cases, sections of the laminate 440 may be translucent while other sections of the laminate 440 may be opaque to block visibility of corresponding areas under the laminate 440. These opaque sections of the laminate 440 may also act as visual elements that help to camouflage the authentication hologram(s) 430.

As FIG. 4 further illustrates, one or more additional visual elements 450 can be further applied to the laminate 440. The visual element(s) 450 can help to hide the authentication hologram(s) 430. The visual element(s) 450 may include additional print elements and/or additional holograms. As such, the visual element(s) 450 may be applied to the laminate 440 by printing, embossing, debossing, laser etching, laser engraving, laser imaging, three-dimensional printing, and/or hot or cold foil processing. The visual element(s) 450 may be defined by text, pictures, graphics, patterns, shapes, markings, or the like. Additionally, the visual elements 450 may be defined by a plurality of colors.

Figure 5:
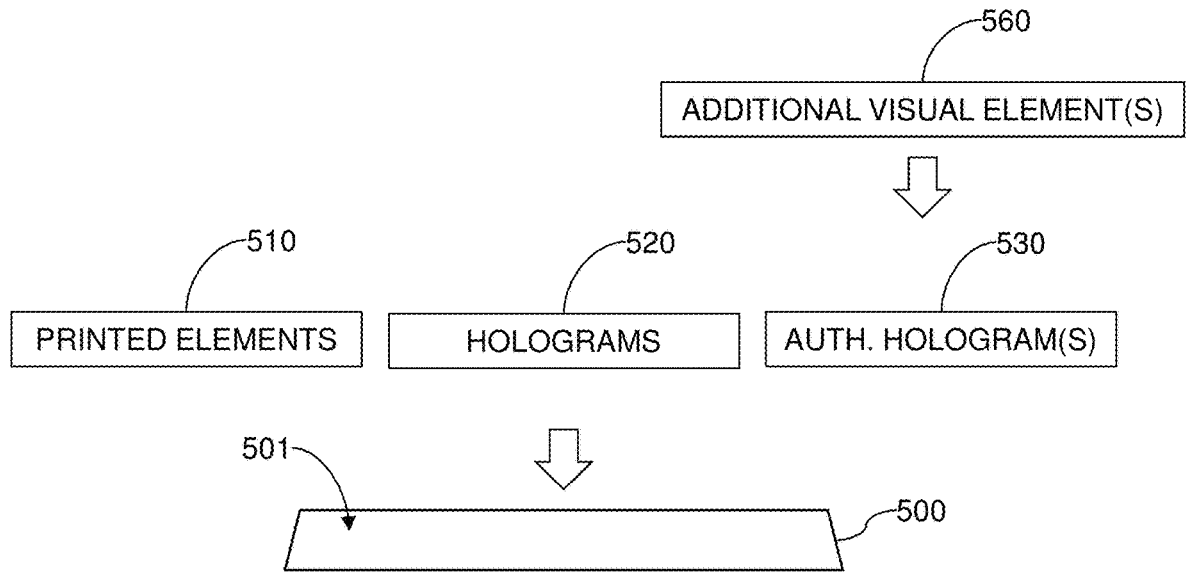
FIG. 5 illustrates an example authenticatable object with additional visual elements applied over authentication hologram(s), according to aspects of the present disclosure.

The application of additional visual elements is not limited to a laminate. In general, to provide further camouflage for the authentication hologram(s), additional visual elements can be applied over any area of a surface of an object and/or any layer of material applied to the object. In particular, as shown in FIG. 5, authentication hologram(s) 530, which may be similar to the authentication hologram(s) 430 above, are applied to a surface 501 of another example authentication object 500. One or more additional visual elements 560 can be applied directly over the authentication hologram(s) 530. The additional visual element(s) 560, for instance, may include printed elements defined by text, pictures, graphics, patterns, shapes, markings, or the like. The visual element(s) 560 may also be defined by a plurality of colors. Printed elements 510 and other holograms 520, which may be similar to the printed elements 410 and the holograms 420, respectively, may also be applied to the surface 501.

Figure 6:
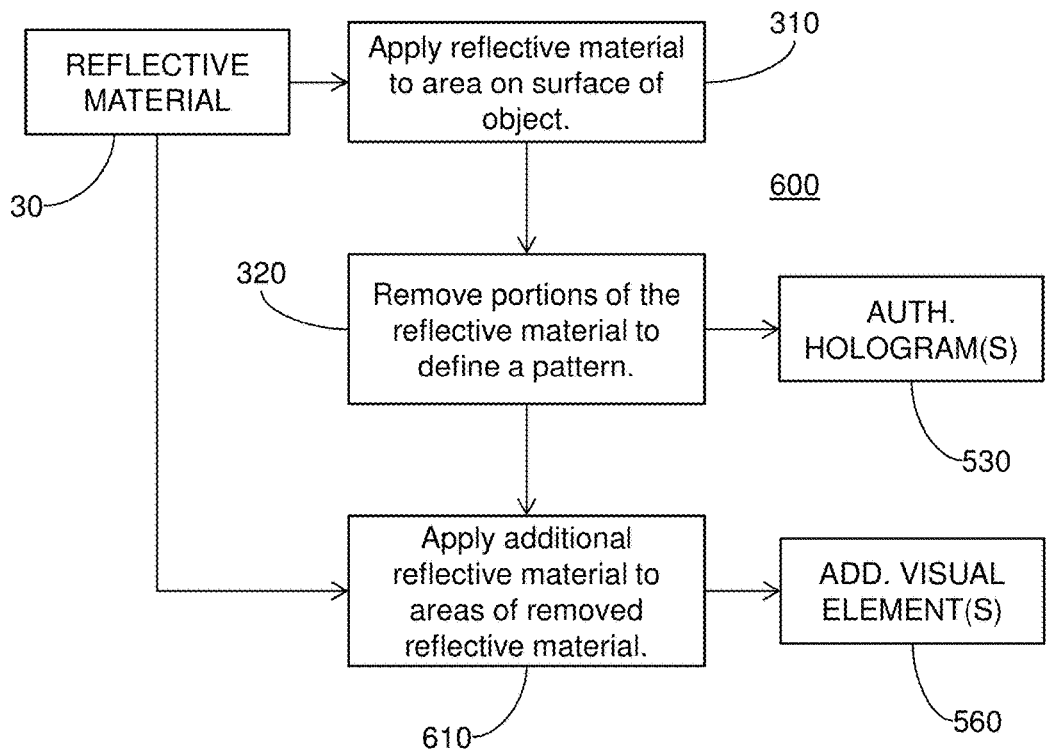
FIG. 6 illustrates an example process for applying additional visual elements over authentication hologram(s), according to aspects of the present disclosure.

As shown in the example process 600 of FIG. 6, the additional visual element(s) 560 may involve the application of additional reflective material to authentication hologram(s) 530. As described above with reference to FIG. 3, reflective material 30 can be applied to an area on surface of an object in the act 310 and portions of the reflective material 30 can be removed in the act 320 to define a pattern for the authentication hologram(s) 530. As FIG. 6 illustrates, a further act 610 may involve applying additional reflective material 30 to the areas where the reflective material 30 was previously removed in act 320. The additional reflective material 30 applied in act 610 defines additional visual element(s) 560 that can camouflage aspects of the authentication hologram(s) 530 without affecting the ability to detect the authentication information in the authentication hologram(s) 530.

Figure 7:
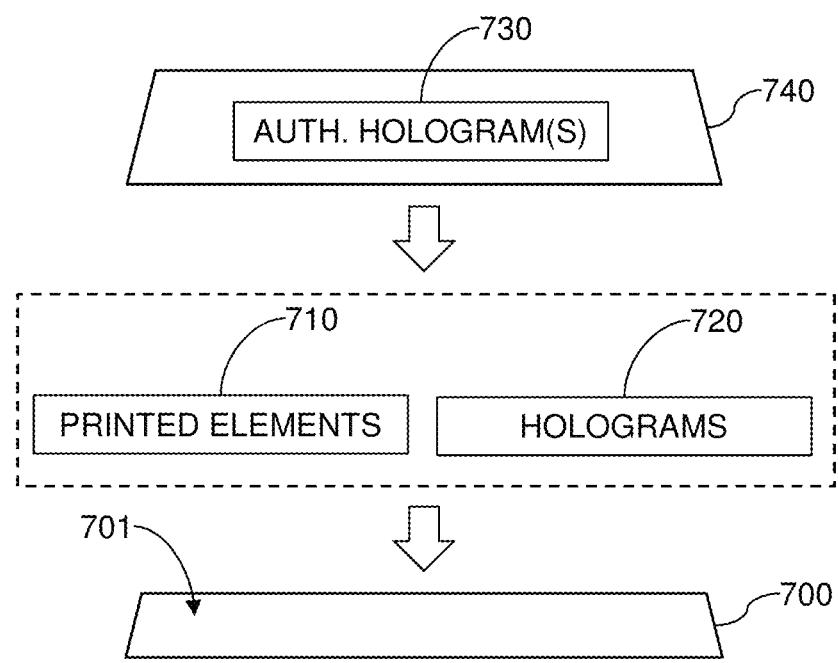
FIG. 7 illustrates an example authenticatable object and a laminate applied to the object where the laminate includes authentication hologram(s), according to aspects of the present disclosure.

FIG. 7 illustrates another example authenticatable object 700 with a laminate 740 applied over a surface 701 of the object 700. Printed elements 710 and holograms 720, which may be similar to the printed elements 410 and the holograms 420, respectively, are also applied to the surface 701. The laminate 740 is applied over the printed elements 710 and the holograms 720. The laminate 740 may be similar in some aspects to the laminate 440. For instance, the laminate 740 may be a polycarbonate laminate or a polyvinyl chloride laminate. Additionally, one or more additional visual elements (not shown) can be optionally applied to the laminate 740.

Authentication hologram(s) 730 are also applied over the surface 701. In contrast to the embodiments above, however, the authentication hologram(s) 730 are embedded within the laminate 740 and are applied over the surface 701 with the application of the laminate 740. When embedded within the laminate 740, the authentication hologram(s) 730 may be more secure and resistant to tampering.

Advantageously, the laminate 740 can be employed to convert a pre-existing object into the authenticatable object 700. For instance, a pre-existing state-issued driver's license might not include any features that effectively prevent unauthorized reproduction of the driver's license. When the laminate 740 is applied to the driver's license, however, the authentication hologram(s) 730 embedded within the laminate 740 are simultaneously applied to the driver's license. With the authentication hologram(s) 730, the driver's license is now authenticatable. For instance, latent authentication information in the authentication hologram(s) 730 can be extracted and decoded, e.g., with a mobile application on a smart device, to confirm the authenticity of the driver's license as described above. Such conversion of an existing driver's license provides a convenient and cost-effective alternative to replacing the existing driver's license or making more difficult modifications to a surface of the driver's license to add authentication hologram(s).

In other embodiments, however, the authentication hologram(s) 730 may be otherwise coupled to the laminate 740 to allow the authentication hologram(s) 730 to be simultaneously applied with the laminate 740 on the object 700. For instance, the authentication hologram(s) 730 may be applied to an outer surface of the laminate 740 prior to applying the laminate 740 to the object 700.

In the embodiments described herein, the visual elements applied around or over the authentication holograms may convey additional information. Indeed, the visual elements may provide additional information for authenticating the object. This additional authentication information may also be latent. Employing the authentication system 200 described above, the program instructions 232 executed by the processor(s) 220 can also detect and process the additional authentication information in other visual elements to supplement the use of the authentication hologram(s) 430.

Although the embodiments described herein may employ the latent authentication information in authentication holograms to determine whether an object is authentic, latent information in holograms formed as described above may also be employed to communicate other types of information. For instance, an employee identification card might include a hologram with latent information to provide access to a particular secure location and another hologram with different latent information to provide access to a different secure location.

In view of the present disclosure, holograms with latent information are employed to authenticate objects, such as secure documents, and to prevent unauthorized reproduction of such objects. The latent information can be decoded and/or compared to known validation information to determine the authenticity of the objects. Such holograms may be set among various visual elements to hide the holograms from easy detection. Furthermore, various approaches for capturing images of the holograms and extracting the latent information overcome the problem of light reflected by the holograms, where the reflected light can obscure the holograms in the captured images.

As described above, according to some aspects of the present disclosure, some or all of the steps of the above-described and illustrated procedures can be automated or guided under the control of a processing system, e.g., the authentication system 200. Generally, the processing system may be implemented as a combination of hardware and software elements. The hardware aspects may include combinations of operatively coupled hardware components including microprocessors, logical circuitry, communication/networking ports, digital filters, memory, or logical circuitry. The processing system may be adapted to perform operations specified by a computer-executable code, which may be stored on a computer readable medium.

As described above, the processing system may be a programmable processing device, such as an external conventional computer or an on-board field programmable gate array (FPGA) or digital signal processor (DSP), that executes software, or stored instructions. In general, physical processors and/or machines employed by embodiments of the present disclosure for any processing or evaluation may include one or more networked or non-networked general purpose computer systems, microprocessors, field programmable gate arrays (FPGA's), digital signal processors (DSP's), micro-controllers, and the like, programmed according to the teachings of the exemplary embodiments of the present disclosure, as is appreciated by those skilled in the computer and software arts. The physical processors and/or machines may be externally networked with the image capture device(s), or may be integrated to reside within the image capture device. Appropriate software can be readily prepared by programmers of ordinary skill based on the teachings of the exemplary embodiments, as is appreciated by those skilled in the software art. In addition, the devices and subsystems of the exemplary embodiments can be implemented by the preparation of application-specific integrated circuits or by interconnecting an appropriate network of conventional component circuits, as is appreciated by those skilled in the electrical art(s). Thus, the exemplary embodiments are not limited to any specific combination of hardware circuitry and/or software.

Stored on any one or on a combination of computer readable media, the exemplary embodiments of the present disclosure may include software for controlling the devices and subsystems of the exemplary embodiments, for driving the devices and subsystems of the exemplary embodiments, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present disclosure for performing all or a portion (if processing is distributed) of the processing performed in implementations. Computer code devices of the exemplary embodiments of the present disclosure can include any suitable interpretable or executable code mechanism, including but not limited to scripts, interpretable programs, dynamic link libraries (DLLs), Java classes and applets, complete executable programs, and the like. Moreover, parts of the processing of the exemplary embodiments of the present disclosure can be distributed for better performance, reliability, cost, and the like.

Common forms of computer-readable media may include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present disclosure has been described with reference to one or more particular embodiments, those skilled in the art will recognize that many changes may be made thereto without departing from the spirit and scope of the present disclosure. Each of these embodiments and obvious variations thereof is contemplated as falling within the spirit and scope of the invention. It is also contemplated that additional embodiments according to aspects of the present disclosure may combine any number of features from any of the embodiments described herein.

We claim:
1. An authentication system, comprising:
an object including an authentication hologram disposed over an area of an entire surface of the object, the authentication hologram being defined by a pattern of reflective material and including latent authentication information, wherein the object includes a laminate applied over the entire surface of the object, including the area, and wherein the laminate diffuses light and reduces an effect of reflected light on the entire surface; and
a non-transitory computer-readable medium including program instructions for execution by one or more processors, the program instructions being executable by the one or more processors to:
(i) receive, from an image capture device, a digital image of the authentication hologram, wherein light reflected by the reflective material is captured in the digital image of the authentication hologram, and
(ii) detect the latent authentication information in the digital image of the authentication hologram, wherein the light is further diffused and the effect of the reflected light is reduced on the entire surface by the laminate to detect the latent authentication information.

2. The system according to claim 1, wherein to detect the latent authentication information, the program instructions are executable by the one or more processors to determine a contrast for the digital image of the authentication hologram and apply a filter to the digital image based on the contrast, the filter reducing the effect of the reflected light and allowing the latent authentication information to be detected.

3. The system according to claim 2, wherein the object includes one or more additional visual elements applied over the area of the entire surface of the object, the one or more additional visual elements including at least one of printed elements or additional holograms.

4. The system according to claim 3, wherein the one or more additional visual elements include additional authentication information, and the program instructions are executable by the one or more processors to detect the additional authentication information in the one or more visual elements.

5. The system according to claim 2, wherein the reflective material is applied to the area of the entire surface of the object, and portions of the reflected material are removed from the area to leave the pattern of reflective material on the area to define the authentication hologram, at least approximately 20% to approximately 80% of the reflective material on the entire surface remaining after the portions of the reflective material are removed from the entire surface.

6. The system of claim 5, wherein the object includes additional reflective material applied to areas from which the portions of the reflective material are removed.

7. The system according to claim 1, wherein the authentication hologram is embedded within the laminate.

8. The system according to claim 1, wherein the object includes one or more additional visual elements applied to the laminate, the one or more additional visual elements including at least one of printed elements or additional holograms.

9. The system according to claim 1, further comprising a remote system storing validation information, wherein the program instructions are executable by the one or more processors to authenticate the latent authentication information based on a comparison between the latent authentication information and the validation information stored on the remote system.

10. The system according to claim 1, wherein the program instructions are executable by the one or more processors to decode the latent authentication information in the digital image of the authentication hologram.

11. The system according to claim 1, wherein the laminate comprises: (i) a first section applied over a first portion of the entire surface, wherein the first section is translucent; and (ii) a second section applied over a second portion of the entire surface, wherein the second section is opaque, and wherein the second section of the laminate camouflages the authentication hologram.

12. The system according to claim 1, wherein the laminate comprises one or more of a polycarbonate laminate material or a polyvinyl chloride laminate material.

13. An authenticatable object, comprising:
an authentication hologram applied over an area of an entire surface of the object, the authentication hologram including latent authentication information;
a laminate applied over the entire surface of the object, including the area, and wherein the laminate diffuses light and reduces an effect of reflected light on the surface; and
one or more additional visual elements applied at least partially over the authentication hologram.

14. The authenticatable object according to claim 13, wherein the one or more additional visual elements includes at least one of printed elements or additional holograms.

15. The authenticatable object according to claim 13, wherein the one or more additional visual elements include additional authentication information.

16. The authenticatable object according claim 13, wherein the one or more additional visual elements are applied to the laminate.

17. The authenticatable object according claim 13, wherein the one or more additional visual elements are applied to the authentication hologram.

18. The authenticatable object according to claim 13, wherein the authentication hologram is embedded within the laminate.

19. The authenticatable object according to claim 13, wherein the authentication hologram includes a reflective material applied to the area, and portions of the reflective material are removed from the area to leave a pattern of reflective material on the area, the pattern of reflective material defining the latent authentication information for the authentication hologram.

20. The system according to claim 19, wherein the object includes additional reflective material applied to areas from which the portions of the reflective material are removed.

* * * * *